US008769038B2

(12) United States Patent
Montoya

(10) Patent No.: US 8,769,038 B2
(45) Date of Patent: Jul. 1, 2014

(54) REMOTE DEVICE DIAGNOSTIC AND REPAIR APPARATUS AND METHODS

(75) Inventor: Adam Montoya, Louisville, KY (US)

(73) Assignee: Flextronics AP, LLC, Broomfield, CO (US)

(*) Notice: Subject to any disclaimer, the term of this patent is extended or adjusted under 35 U.S.C. 154(b) by 0 days.

(21) Appl. No.: 12/990,023

(22) PCT Filed: Jul. 30, 2010

(86) PCT No.: PCT/US2010/044030
§ 371 (c)(1),
(2), (4) Date: Feb. 2, 2012

(87) PCT Pub. No.: WO2011/014846
PCT Pub. Date: Feb. 3, 2011

(65) Prior Publication Data
US 2012/0254345 A1   Oct. 4, 2012

Related U.S. Application Data

(60) Provisional application No. 61/229,952, filed on Jul. 30, 2009.

(51) Int. Cl.
*G06F 15/16* (2006.01)
*G06F 11/22* (2006.01)

(52) U.S. Cl.
CPC .................................. *G06F 11/2294* (2013.01)
USPC ........... 709/217; 709/218; 709/219; 709/224; 701/31.4; 701/31.5

(58) Field of Classification Search
USPC ....................... 709/217–219, 224; 701/31.4–5
See application file for complete search history.

(56) References Cited

U.S. PATENT DOCUMENTS

| 5,887,164 | A  | * | 3/1999  | Gupta ............................... 713/2 |
| 8,397,108 | B1 | * | 3/2013  | Vannatter et al. ............... 714/57 |
| 2001/0022615 | A1 | * | 9/2001  | Fernandez et al. ............ 348/143 |
| 2002/0143446 | A1 | * | 10/2002 | Rogers et al. ................... 701/33 |
| 2003/0191955 | A1 | * | 10/2003 | Wagner et al. ................. 713/191 |
| 2004/0009777 | A1 | * | 1/2004  | Koskimies et al. ........ 455/456.1 |
| 2004/0015559 | A1 |   | 1/2004  | Goldstein |
| 2004/0133674 | A1 | * | 7/2004  | Sasaki .......................... 709/224 |
| 2004/0260704 | A1 | * | 12/2004 | Moore ......................... 707/100 |
| 2005/0065678 | A1 | * | 3/2005  | Smith et al. ..................... 701/29 |
| 2005/0159988 | A1 | * | 7/2005  | Ramseyer ........................ 705/5 |
| 2005/0171661 | A1 | * | 8/2005  | Abdel-Malek et al. .......... 701/33 |
| 2005/0180326 | A1 | * | 8/2005  | Goldflam et al. ............. 370/231 |
| 2005/0257100 | A1 | * | 11/2005 | Anglin et al. ................... 714/48 |
| 2006/0101311 | A1 | * | 5/2006  | Lipscomb et al. ............. 714/47 |
| 2006/0130054 | A1 | * | 6/2006  | Bocking et al. ............... 717/173 |
| 2006/0230165 | A1 | * | 10/2006 | Zimmer et al. ............... 709/230 |
| 2007/0005201 | A1 | * | 1/2007  | Chenn ............................ 701/29 |

(Continued)

*Primary Examiner* — Alina N Boutah
(74) *Attorney, Agent, or Firm* — Haverstock & Owens LLP

(57) ABSTRACT

Methods and apparatus are disclosed for servicing a target device with a remote access device. The target device has a target-device input/output interface and the remote access device has a remote-access-device input/output interface that are operatively coupled at the hardware level. A wireless communication link is established between the remote access device and a communications network to establish a communication link between a computer remote from the target device and from the remote access device. Service instructions are received from the computer at the remote access device over the communication link. The received service instructions are transmitted through the coupled input/output interfaces to service the target device.

23 Claims, 6 Drawing Sheets

(56) References Cited

U.S. PATENT DOCUMENTS

| | | | |
|---|---|---|---|
| 2007/0050106 A1* | 3/2007 | Chinnadurai | 701/29 |
| 2007/0161380 A1* | 7/2007 | Fok et al. | 455/456.1 |
| 2007/0216521 A1* | 9/2007 | Guensler et al. | 340/439 |
| 2007/0255115 A1* | 11/2007 | Anglin et al. | 600/300 |
| 2007/0294685 A1* | 12/2007 | Oh | 717/168 |
| 2008/0059606 A1 | 3/2008 | Konopka et al. | |
| 2008/0134049 A1* | 6/2008 | Gupta et al. | 715/738 |
| 2008/0155129 A1* | 6/2008 | Khedouri et al. | 710/8 |
| 2009/0006632 A1* | 1/2009 | Ramanathan et al. | 709/228 |
| 2009/0031403 A1* | 1/2009 | Huang | 726/4 |
| 2009/0138866 A1* | 5/2009 | Veillette et al. | 717/168 |
| 2009/0217025 A1* | 8/2009 | Paul et al. | 713/2 |
| 2009/0276115 A1* | 11/2009 | Chen | 701/32 |
| 2009/0307763 A1* | 12/2009 | Rawlins et al. | 726/5 |
| 2010/0023602 A1* | 1/2010 | Martone | 709/220 |
| 2010/0138270 A1* | 6/2010 | Werth et al. | 705/9 |
| 2010/0161343 A1* | 6/2010 | Kennedy et al. | 705/1.1 |
| 2010/0174446 A1* | 7/2010 | Andreasen et al. | 701/33 |
| 2010/0223504 A1* | 9/2010 | DeHaan et al. | 714/37 |
| 2011/0153151 A1* | 6/2011 | Rogers et al. | 701/33 |
| 2012/0010775 A1* | 1/2012 | Chenn | 701/31.5 |
| 2012/0015644 A1* | 1/2012 | Danford et al. | 455/419 |
| 2012/0168498 A1* | 7/2012 | Couper et al. | 235/379 |

* cited by examiner

REMOTE DEVICE DIAGNOSTIC AND REPAIR APPARATUS AND METHODS

CROSS-REFERENCE TO RELATED APPLICATION

This application is a nonprovisional of, and claims the benefit of the filing date of, U.S. Prov. Pat. Appl. No. 61/229,952, entitled "REMOTE DEVICE DIAGNOSTIC AND REPAIR APPARATUS," filed Jul. 30, 2009 by Adam Montoya. The entire application is hereby incorporated by reference for all purposes.

BACKGROUND

This application relates generally to technical support for devices. More specifically, this application relates to remotely provided technical support for electronic or mechanical devices, examples of which include personal computers, laptops, mobile phones, handheld computers, tablet or pad computers, and the like.

As used herein, the phrase "technical support" refers broadly to a range of services that may be provided in maintaining or updating the functionality of devices. By way of example, such technical support may include the diagnosis of malfunctions with the devices or with software loaded on the devices, may include the repair of the devices or of software loaded on the devices, may include updating software loaded on the devices, may include loading new software on the devices, and the like. Technical support may be provided under a variety of different circumstances, such as in response to a malfunction of hardware or software as might be caused by an innocent conflict in different software loaded on the device or as a result of malicious infection by a software virus. It may also be provided when incompatibilities in software have resulted from upgrades or when a customer desires to upgrade software even in the absence of such incompatibilities.

Technical support is currently provided to the users of devices in a variety of different ways depending on different situations and environments in which such devices are used. For example, those who sell and/or lease devices to customers frequently provide technical-support services for those devices either free or on a fee basis. This model applies to both private and organizational customers and may take the form of having technical-support staff visit a private or organizational site to perform technical support on a device, or may take the form of providing technical support in the form of guidance provided remotely by telephone, by email, through a web site, or the like.

In addition to technical support provided by the seller or lessor of a device, many organizations, particularly larger organizations, have a technical staff that is employed to provide technical support to other employees of the organization. This technical staff may, moreover, provide technical support directly with a particular device or may act as an expert intermediary with the technical support provided by the seller or lessor of the device. Such technical staff may at times make contact with the seller or lessor to obtain guidance by telephone, email, a web site, or the like, or may coordinate an in-person visit by a technician provided by the seller or lessor of the device.

In still other circumstances, some third-party businesses provide technical support to individuals, businesses, or both. Such service providers may be equipped to provided technical support to a variety of different kinds of devices produced by a variety of different sellers, providing an arrangement that is particularly convenient for private individuals needing technical support. In addition to providing guidance by telephone, email, web site, or the like, such technical-support business may provide options to customers either to have an on-site visit by a technician or to have customers bring or send their devices to a service location where staff will perform the technical support There are deficiencies with each of these models. Many individuals are uncomfortable performing support functions when guided by telephone or email because they are not confident in their ability to perform those functions without disrupting other functionality of the device. Guidance given by such mechanisms is well-recognized to be less effective than those models in which a service technician has direct access to the device—instructions given by the service technician may be misunderstood, the individual following them may give inaccurate or incomplete information to the technician, and it may be difficult for the technician to respond to unexpected behavior in the device when provided with such inaccurate or incomplete information. At the same time, there are significant costs associated with having a technician visit the site where the device is located, whether that site be a business location or location of an individual. Such costs may be mitigated when the device is brought to a location where the technician is located, but even in such instances there are costs associated with maintaining technicians having diverse skill sets at different hours in each location that may be convenient for multiple customers.

There is accordingly a need in the art for improved methods and systems for providing technical support.

SUMMARY

Embodiments of the invention provide methods and apparatus for servicing a target device with a remote access device. The target device has a target-device input/output interface and the remote access device has a remote-access-device input/output interface.

In methods of the invention, the target-device input/output interface and the remote-access-device input/output interface are operatively coupled at the hardware level. A wireless communication link is established between the remote access device and a communications network to establish a communication link between a computer remote from the target device and from the remote access device. Service instructions are received from the computer at the remote access device over the communication link. The received service instructions are transmitted through the coupled input/output interfaces to service the target device.

In some embodiments, the target device may lack a functioning operating system or may lack a functioning network connection.

The remote access device may further have a data store and the service instructions may comprise instructions to install data from the data store onto the target device. In such embodiments, the data from the data store are accordingly installed onto the target device in accordance with the instructions. Examples of data that may be included on the remote access device include an operating system image, a diagnostic tool, or a software application.

Each of the target-device input/output interface and the remote-access-device input/output interface may comprise a KVM/USB interface. The wireless communication link may comprise a wireless wide-area-network communication link.

The remote-access-device input/output interface may be configured differently in different embodiments also. For example, in some embodiments it comprises a single-node interface, which finds application in a particular embodiment where the remote access device is comprised by a self-service kiosk. Alternatively, the remote-access-device input/output interface may comprise a multinode interface to which a second target device is operatively coupled at the hardware level.

Embodiments of the invention are also directed to a remote access device that comprises an input/output interface adapted for operative coupling with a target device at a hardware level. A wireless interface is adapted for communicative coupling with a network to establish a communication link between a computer remote from the target device and from the remote access device. A logic module comprises program code for receiving service instructions from the computer at the remote access device over the communication link and program code for transmitting the received instructions through the input/output interface to the target device.

In certain specific embodiments of the remote access device, various features may be included as described in connection with the embodiments of methods for remotely servicing a target device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral following a hyphen to denote one of multiple similar components. When reference is made to a reference numeral without specification to an existing sublabel, it is intended to refer to all such multiple similar components.

DETAILED DESCRIPTION OF EXEMPLARY EMBODIMENTS

Embodiments of the invention make use of a remote access device that enables direct technical-support services to be provided by a remote service technician. The services are direct in that the remote service technician is provided with full control over the device to be serviced (herein the "target device"). For example, in embodiments where the target device is configured to interact with a mouse and keyboard, the technician may take control over mouse and keyboard functionality, may transfer various diagnostic and repair applications to the target device, may run system scans, may install antivirus programs or updated software, and the like.

The technician may in some embodiments also be able to reboot the target device and reconnect with it remotely to continue working without local assistance by the user of the target device. Repairs that may be effected in these embodiments include the removal of computer virus and spyware, functional optimization of the device and of software resident on the device, registry repair, device-driver repair, repair of internet related issues, providing security updates, in addition to many others.

Advantageously, as described below, the remote access device permits technical support to be provided to target devices that may have physical damage, target devices that are unable to boot an operating system, and/or target devices that have no working network connection.

Some embodiments may include a network connection separate from the target computer's network connection such that a dependency on a working network connection of the target device is eliminated. In addition, some embodiments may include data storage that may be used to provide data to the target device, such as in embodiments where it is used as virtual media for the target device. For instance, such data might include operating-system images, updates, diagnostics, or other data.

Advantageously, the embodiments described herein may permit technical resources to be located geographically remote from the target device, even while enabling direct technical-support services to be provided in a manner that mimics on-site technical support. Such embodiments enable human resources to be more efficiently allocated and scheduled to address challenges of assisting customers in diverse geographical locations.

Figure 1:
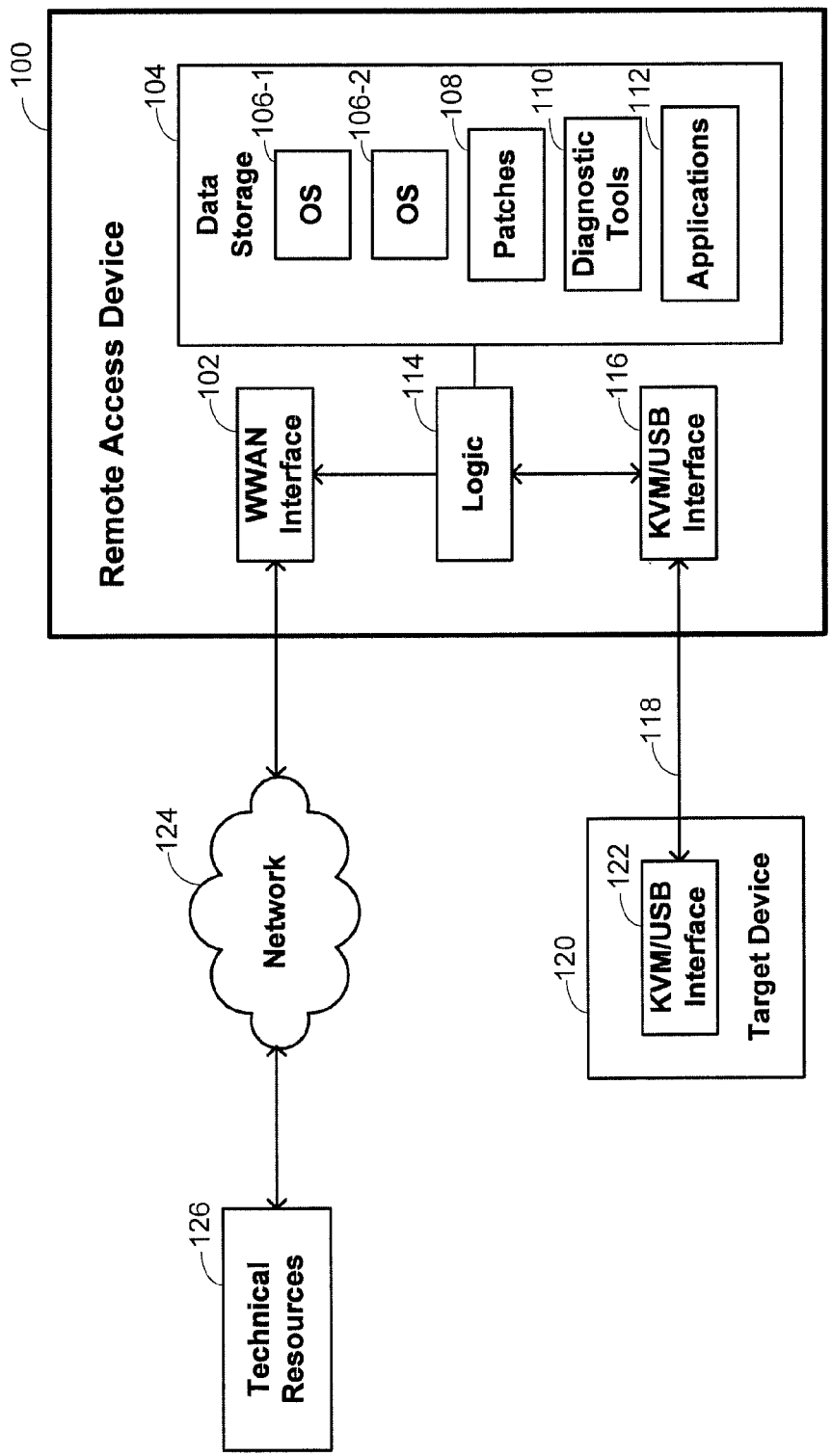
FIG. 1 provides an overview of a system that includes a remote access device to provide technical-support services remotely.

FIG. 1 provides an overview of systems that make use of the remote access device 100 in providing technical-support services. To implement such services, the remote access device 100 is provided in electrical communication with the target device 120 and a network 124 that is accessible by technical resources 126. The target device 120 may comprise an electronic device such as a desktop computer, a notebook computer, a server, a mobile telephone, a smart phone, a pad computer, part of a kiosk, or the like in different embodiments. In other embodiments, the target device 120 may comprise a home-automation appliance, such as may be used to control a DVR, a biometric access control, automatic power cycling in the home, and the like.

The target device 120 may also include some or all of the components commonly associated with computational devices, including memory, processors, and input/output devices such as a keyboard, a mouse, a display, and the like. In certain embodiments, the target device 120 is owned by an individual consumer, although this is not required. Indeed, in other embodiments, the target device 120 is owned by an organization for use by employees of the organization.

The network 124 may comprise a public network such as the Internet in some embodiments, or may comprise a private network in other embodiments.

The technical resources 126 may include human technicians having equipment that enables them to interact with the network 124. Such human technicians could be employed by a service provider in some embodiments that is hired only to perform the technical-support functions needed, or might be employed by an organization that also employs a user of the target device 120, depending on how the remote access device is used.

The remote access device 100 may comprise an interface that is operable to be communicatively coupled with an interface comprised by the target device 120. In the illustrated embodiment, such interfaces are shown as keyboard/video/ mouse/USB ("KVM/USB") interfaces, with the KVM/USB interface of the remote access device 100 being identified by reference numeral 116 and the KVM/USB interface of the target device 120 being identified by reference numeral 122, but other types of interfaces are also within the intended scope of the invention. For example, in some embodiments serial interfaces may be used, particularly for application to legacy systems that make use of serial interfaces in routers and/or switches. Connections 118 that are used to establish communication between the KVM/USB interface 116 of the remote access device 100 and the KVM/USB interface 122 of the target device 120 may have different structures in different environments. Merely by way of example, the connections 118 might comprise USB cables, VGA cables, serial cables, parallel cables, or other types of connections that are operative to couple the interfaces. Indeed, in one embodiment the connections 118 comprise a wireless connection in which electromagnetic waves are exchanged between the KVM/USB interfaces 116 and 122. In those embodiments where the connections 118 comprise cable connections, they may be conveniently be color-coded to permit a consumer or other user to easily determine their proper connections.

The KVM/USB interface 116 of the remote access device 100 may generally be operative to emulate signals that would normally be provided to or from the KVM/USB interface 122 of the target device. Such signals might include, for instance, signals representative of signals to and/or from a keyboard, mouse, display, USB devices, and the like. The remote access device 100 may also include logic 114 operative to control various functions of the remote access device 100. For example, such logic 114 may be embodied in one or more processors, an ASIC or FPGA, memory and other components. In addition, the remote access device 100 may include an interface configured to communicate with the network 124. This is shown in the drawing as a wireless wide-area network ("WWAN") interface, although other suitable wired or wireless interfaces may be used in alternative embodiments. A WWAN may advantageously use a mobile telecommunications network that is available across regions, nations, or even globally. Irrespective of the specific form of the interface 124, though, it enables the remote access device 100 to communicate with the technical resources 126 via the network 124.

The remote access device 100 may also include a data store 104 where a variety of different forms of data are stored for access by the logic 114 in implementing the functionality described herein. Merely by way of example, such data may include operating systems images 106, patches 108, diagnostic tools 110, applications 112, and other forms of data. In different embodiments, the physical structure of the data store 104 may differ. For example, magnetic disks may be used in some embodiments in the form of a hard disk drive, optical storage devices may be used, solid-state storage devices may be used, or other types of data storage configurations in different embodiments.

The data store 104 may comprise read-only storage to protect it from malicious attacks by software such as viruses, worms, trojan horses, spyware, adware, or other forms of unwanted software. The data stored on the data store 104 may also be regularly or irregularly updated through the network 124. For instance, in some embodiments, the data are updated during periods of lower-bandwidth consumption to minimize impact to the network 124. Such updates at the data store 104 may be advantageous because they reduce or eliminate the need to download data from a remote location directly to target devices 120 for each target device 120 to be serviced.

In operation, the remote access device is coupled with the target device 120 and network 124 generally into the configuration illustrated schematically in FIG. 1. This configuration permits the technical resources 126 to operate the target device 120 remotely, having the target device 120 respond in a manner that is substantially equivalent to how it would respond if they were interacting directly with the KVM/USB interface 122 instead of interacting with it through the network 124 and remote access device 100.

Since the remote access device 100 interacts with the target device 120 at the hardware level and includes its own (i.e. "out of band" or separate) network connection, the technical resources 126 may service the target device 120 even if the target device 120 does not have a working operating system or independent network connection. The technical resources 126 may also use the data store 104 of the remote access device 100 as virtual media of the target device 120 in implementing various functions. Merely by way of example, the technical resources 126 might reimage an operating system; that is, they might reload the operating system onto the target device 120 using with an operating system that has been stored on the data store 104 of the remote access device. The data store 104 may also be used in performing updates, diagnostics, and other functions on the target device 120, particularly when a malfunction of the target device 120 prohibits using data stored on the target device 120 itself.

It should be appreciated that the components and their relative organization in FIG. 1 are exemplary and that other configurations remain within the intended scope of the invention. For example, while the illustrated embodiment suggests that the data store 104 and network interface 102 are provided within a common housing of the remote access device 100, this is not a requirement of the invention. In alternative embodiments, the data store 104 may be housed separately and provided in communication with the logic 114 of the remote access device 100 through a wired or wireless connection or even coupled to it via a network connection.

Figure 2:
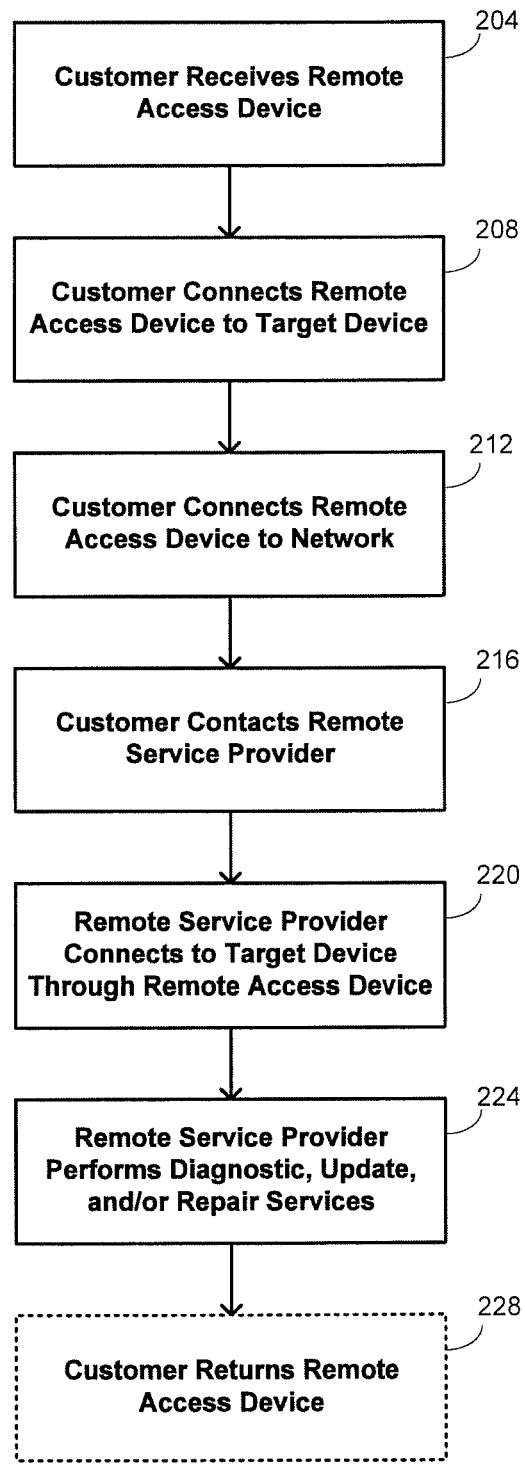
FIG. 2 is a flow diagram that illustrates one embodiment that uses the remote access device to provide technical-support services remotely.

FIG. 2 provides a flow diagram that illustrates how the remote access device 100 may be used in providing technical-support services. In FIG. 2 and in the other flow diagrams discussed herein, steps are displayed in one possible order. Such an ordering is not intended to be limiting. In alternative embodiments, some of the steps may be performed in an order different than that illustrated, some of the steps may be omitted, and certain additional steps not shown explicitly may be performed without deviating from the intended scope of the invention.

In this illustrated embodiment, a customer may be the owner or user of a target device 120 needed technical-support services, such as in an embodiment where the customer is a private individual. At block 204, the customer receives the remote access device 100. Such receipt may occur by sending the remote access device 100 to the customer by mail or via courier to the customer's home or office, or may occur by having the customer retrieve the remote access device 100 from a retail location by purchase or rental. In embodiments where the customer is provided with the remote access device 120 in this way for personal use, it may be housed within relatively rugged material suitable for individual consumer use.

The customer installs the remote access device 100 at blocks 208 and 212 by connecting the remote access device 100 to the target device 120 and by connecting the remote access device 100 to the network 124. Color-coded connectors may in some cases be provided with the remote access device 100 to simplify making the appropriate connections. When the remote access device 100 is appropriately configured, the customer contacts the service provider at block 216. Such contact may be initiated by telephone, by email, or by a web interface depending on the forms of access available to the customer. The customer may need to provide identifying information such as in the form of a serial number to the service provider to identify the particular remote access device 100 to be accessed during the service. In one embodiment, the logic 114 resident on the remote access device 100 may include functionality to advise the service provider over the network 124 that the remote access device 100 is configured and ready for technical services to be provided. For instance, the remote access device 100 might include a button that the customer activates upon completion of establishing the connections at blocks 208 and 212 that causes the logic 114 to send a signal to the technical resources 126 confirming that the configuration has been established.

At block 220, technical resources 126 of the service provided connect to the target device 120 through the remote access device 100 as described above so that diagnostic, update, and/or repair services may be performed at block 224.

When the service is complete, the customer may optionally return the remote access device 100 to the service provider at block 228, such as by returning it by mail or courier, or by returning it to the retail outlet where it was obtained.

Figure 3:
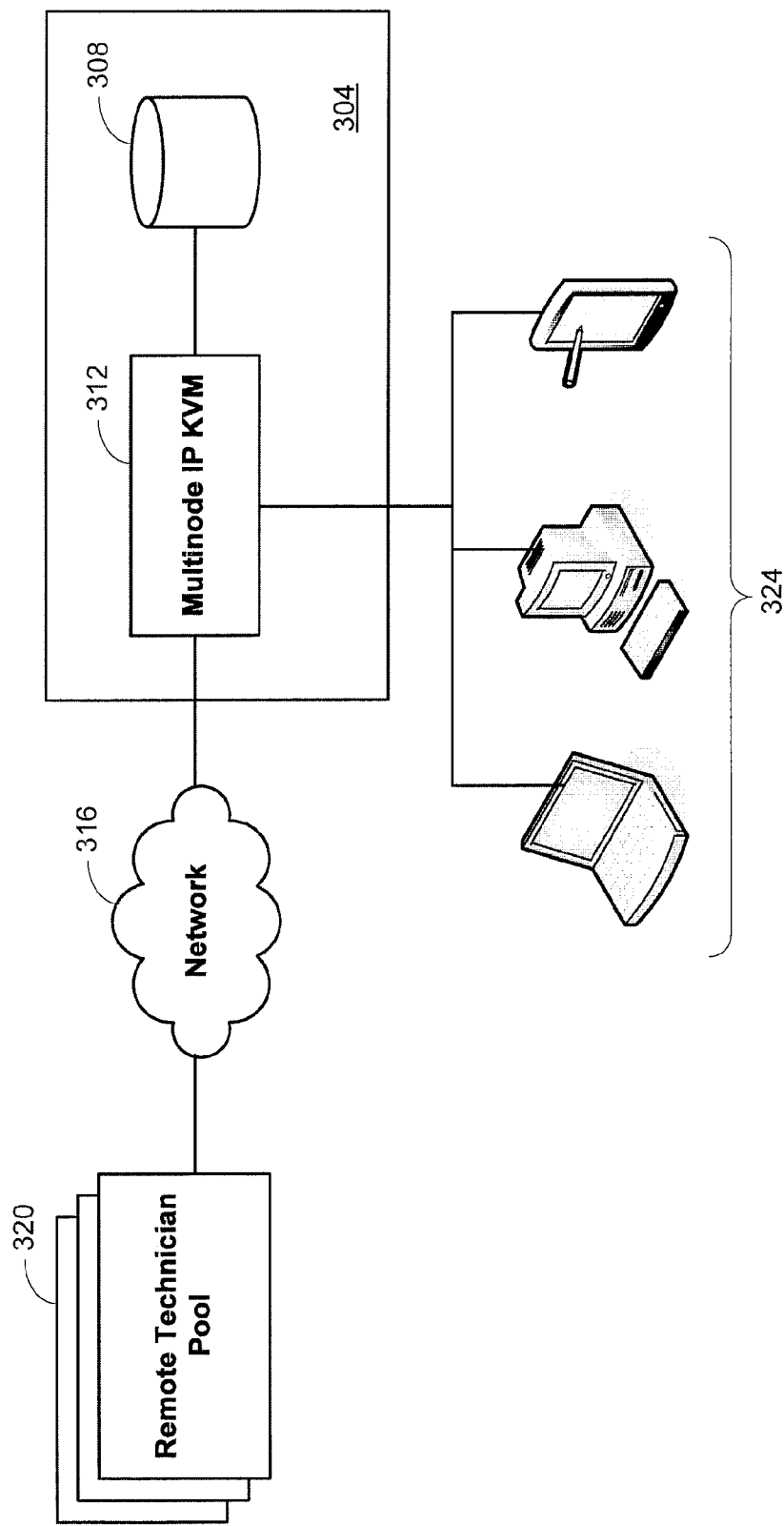
FIG. 3 is a block diagram of a configuration in which the remote access device may be implemented in a retail service environment.

FIG. 3 illustrates another configuration of a remote access device that may find particular application in retail environments, although it may be used in other environments also. In a retail environment, staff may be on hand to assist customers needing technical support services. In practice, customers may bring target devices to the retail outlet for service.

In the illustrated embodiment, the remote access device 304 comprises a multinode IP KVM module 312 that is operable to communicate with target devices 324 via their KVM/USB interfaces. The drawing shows a number of examples of different kinds of target devices 324 that may be serviced, and other kinds may be serviced also. In addition to the multinode IP KVM 312, the remote access device may include other components similar to those shown in FIG. 1, although for purposes of clarity not every component is reproduced in this drawing. The data store 308 may maintain similar kinds of data described above in connection with FIG. 1. A retail environment may be particularly suitable in some embodiments for the data store 308 to comprise a dedicated storage medium attached locally to the service network and may advantageously also comprise real-only storage. To accommodate the different kinds of target devices 324 that may be serviced, the data store 308 may comprise multiple operating-system images and service packs.

The network 316 may comprise a public or private network. In some embodiments, it comprises the Internet, which is accessed by the remote technician pool 320 and by the remote access device 304 through a secured connection.

Figure 4:
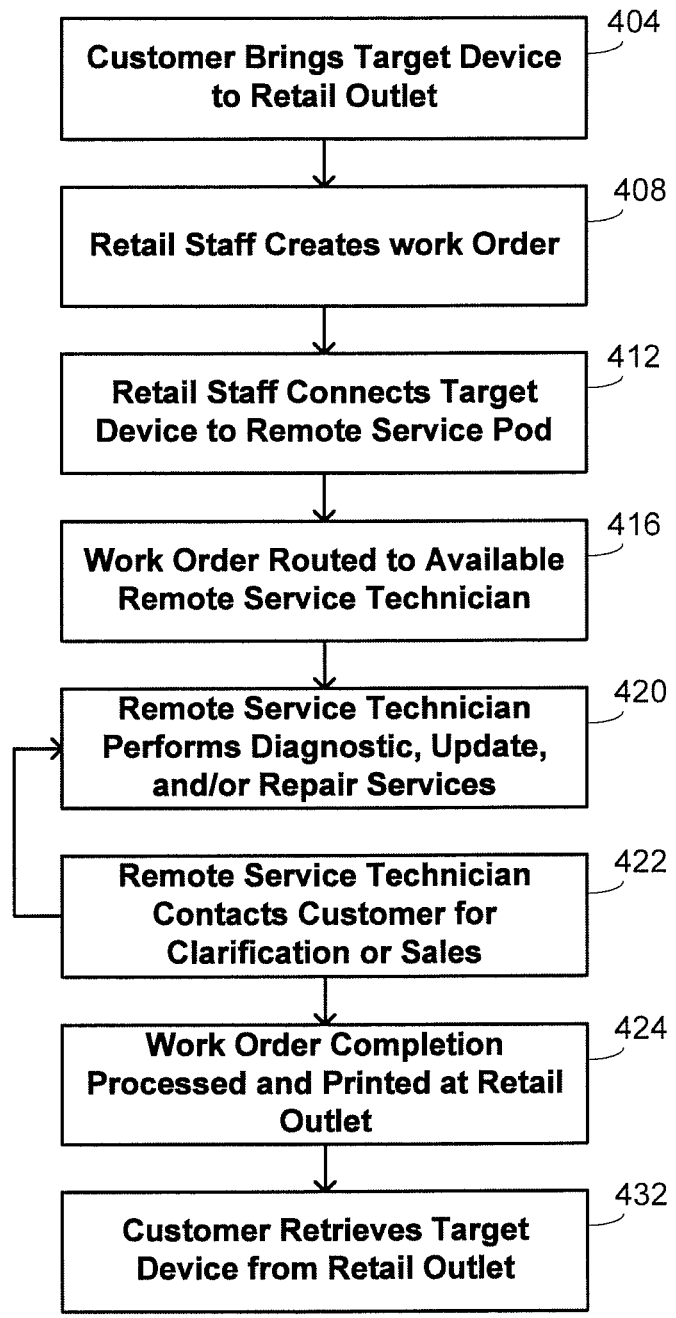
FIG. 4 is a flow diagram illustrating embodiments in which the remote access device may be used in the configuration of FIG. 3.

FIG. 4 is a flow diagram illustrating how the remote access device 304 may be used in a retail environment. The ability to service multiple target devices 324 simultaneously through the multinode IP KVM 312 makes the arrangement shown in FIG. 3 particularly suitable for retail environments since multiple customers may be serviced simultaneously. The invention is not limited by the number of nodes that may be included by the IP KVM module 312, although examples include 16-node, 32-node, and 64-node configurations, each of which enables a number of target devices 324 up to the number of nodes to be serviced simultaneously with a single IP KVM module 312.

The remote technical pool 320 may include technicians located geographically remote from the retail store that includes the remote access device 304. Further, the remote technician pool 320 may include technicians located in multiple locations or countries, and each of those technicians may service target devices 324 that are located at different retail outlets. This flexibility, using the remote technician pool 320 rather than local technicians has a number of efficiencies. It simplifies the allocation and scheduling of human resources to address the challenge of staffing limited and costly resources across multiple retail locations and can effectively make use of different skill sets among different technicians. For instance, a relatively infrequent issue that requires specialized skills to address may be accommodated with a small number of remote technicians having those skills instead of needing to employ a technician with those skills at each retail outlet, while still providing customers with the convenience of having local access to those skills at all the retail outlets.

At block 404 of FIG. 4, the customer brings the target device 324 to the retail outlet, where staff creates a work order at block 408. The target device 324 may be an existing device that requires service or may be a new device purchased at the retail outlet or elsewhere, in which case the technical-support services may take the form primarily of configuring the new device with software in accordance with the specifications of the customer. The retail staff connects the target device 324 to the remote access device 304 at block 412. In some embodiments, the remote access device takes the form of a remote service pod to which multiple target devices 324 are connected for service.

The work order is automatically routed to an available service technician 320 at block 416. At block 420, the remote service technician 320 performs diagnostic, update, and/or repair services in the same manner as described above in connection with FIGS. 1 and 2. If the actual servicing technician 320 requires clarification or has other issues to discuss with the customer, contact may be made with the customer at block 422, with the method iterating between such contact and performing the technical-support services as is necessary to complete the service. During contact with the customer, the servicing technician 320 may at times recommend hardware sales, particularly when a problem with the target device 324 is hardware-related. This recommendation may be coordinated with hardware sales that are otherwise made at the retail outlet. In addition to these types of communications, further communications may be made to the customer recommending additional software, hardware, or other products that may be of interest to the customer, in some circumstances presented as specials for the customer while his target device 324 is "in the shop."

When the technical-support services have been completed, a work-order completion is printed at block 424 and the customer alerted that he can retrieve his target device 324 at block 432. A quality-assurance review may be performed at the retail outlet with the customer when the target device 324 is retrieved.

The entire process flow may be tracked by a real-time tracking system that may include notes as well as provide status updates to customers or to retail staff.

Figure 5:
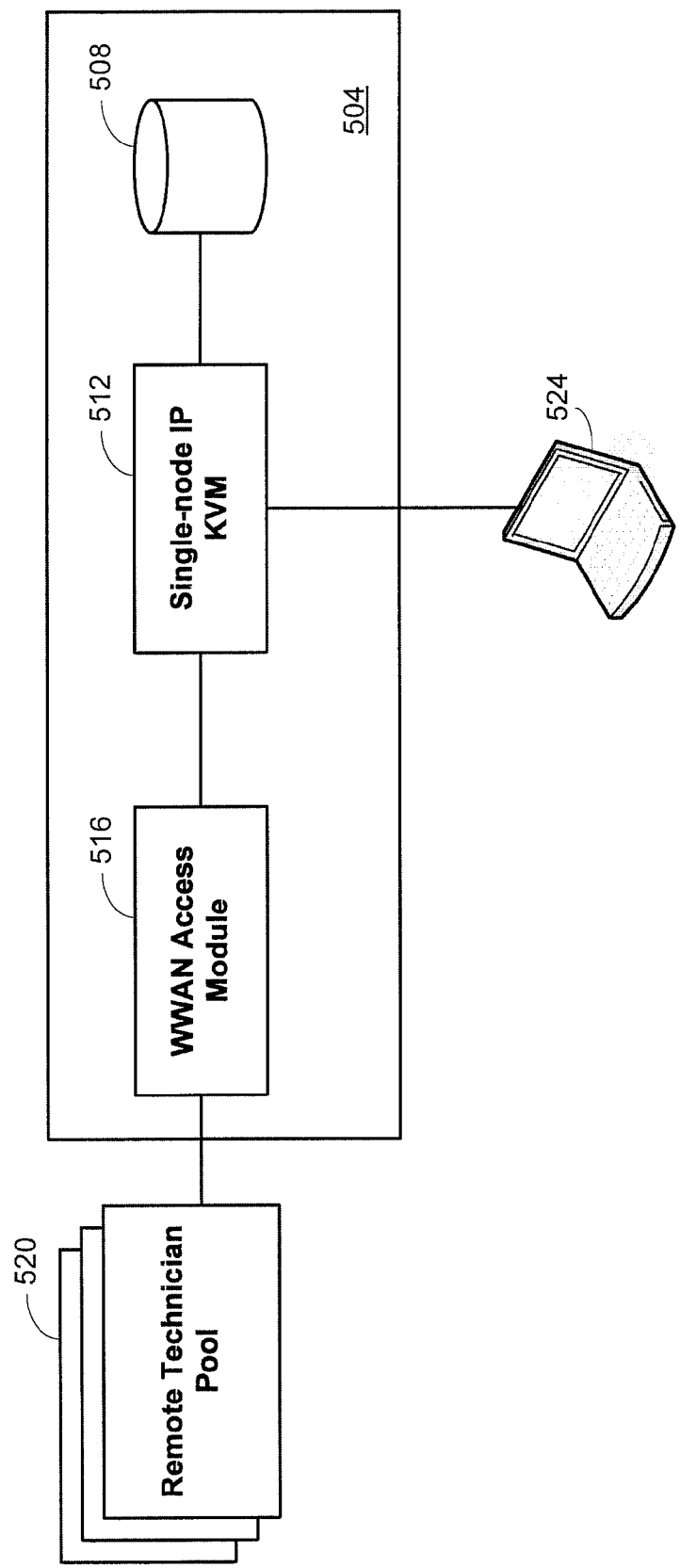
FIG. 5 is a block diagram of a configuration in which the remote access device may be implemented in a self-service environment.

FIG. 5 provides an illustration of yet another embodiment for a remote access device 504 that may be used in providing technical-support services to target devices 524 by a remote technician pool 520. Similar to the embodiments described in connection with FIG. 1, this embodiment includes an IP KVM module 512 and a network interface module 516 for providing a connection between the remote access device 504 and the remote technician pool 520, shown in the specific embodiment as a WWAN access module, although other interfaces are possible in alternative embodiments. The WWAN access module 516 may advantageously be selfaware, meaning that it connects to the network when powered up. The data store 508 may store operating-system images, updates, patches, and/or other data as described above to be provided to a target device.

The configuration shown in FIG. 5 may be used in a number of different environments, one example of which is a kiosk environment that allows the customer to receive technical-support service without engaging retail staff. Such an embodiment is similar to a self-service arrangement since the customer need only bring the target device 524 to the kiosk and can arrange for it to be serviced without the need to interact with retail staff as in the embodiment described in connection with FIGS. 3 and 4.

Figure 6:
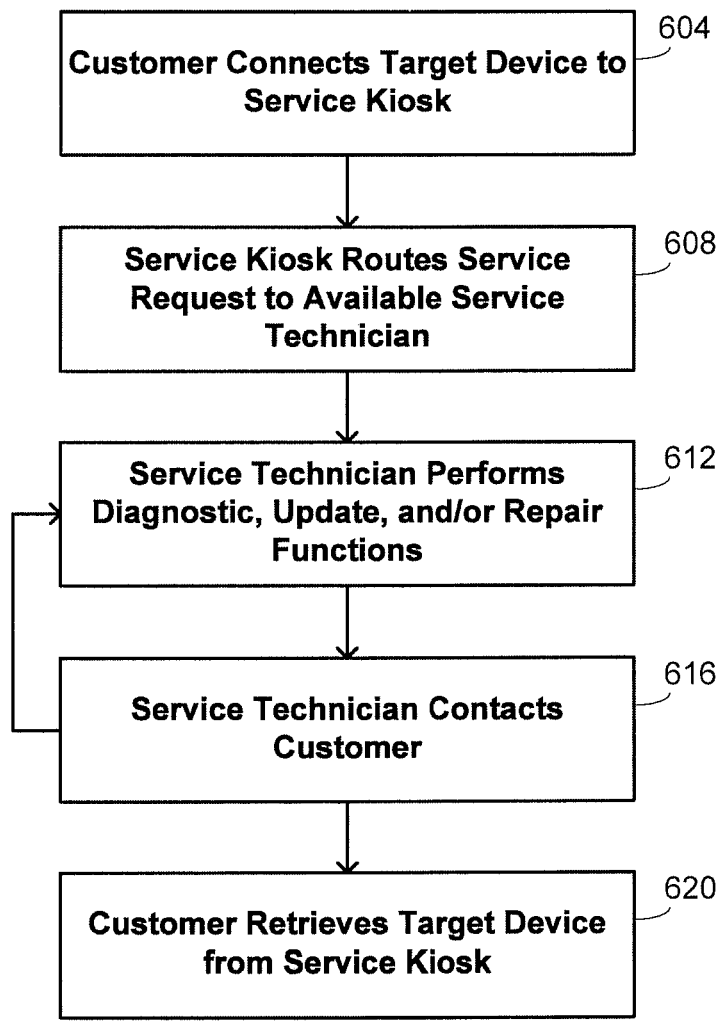
FIG. 6 is a flow diagram illustrating embodiments in which the remote access device may be used in the configuration of FIG. 5.

One use of such an embodiment is illustrated with the flow diagram of FIG. 6. At block 604, the customer connects the target device to the service kiosk, such as by providing a connection between the target device 524 and the IP KVM module 512. Required cabling may be comprised by the kiosk and may be color-coded as described above to facilitate effecting the connection correctly. In some instances, the kiosk may include an audio/video system configured to permit the customer to interact with a servicing system associated with the kiosk. For example, the audio/video system may allow the customer to provide personal identifying information, payment information, information about the target device 524 and the service desired, and the like.

At block 608, the service kiosk routes a service request to an available service technician 520. The kiosk may be configured automatically to detect that a target device 524 has been connected, prompting the creation of the service request or to provide other functionality in direct response to the connection.

At block 612, the service technician 520 performs diagnostic, update, and/or repair functions to the target device 524 in accordance with the service request. If the technician has questions about the service, the customer may be contacted at block 616. In some cases, such contact may be effected using the audio/video system of the kiosk, which may additionally be used for the customer to indicate a desire to interact directly with the service technician who services the target device. In this way, the customer may receive live technical support at the kiosk while the technician 520 is controlling the target device 524 using the remote access device 504.

When the service technician 520 has completed the technical-support services, the customer retrieves the target device 524 at block 620.

The remote access device 504 may be provided for numerous other service configurations in addition to those described herein. For example, it may be used to provide "out of band" services for kiosks, for vending machines, for enterprise servers, or other devices.

The various embodiments disclosed herein have benefits over existing systems. For example, the use of a WWAN interface allows systems that include the remote access devices to be deployed rapidly without the need for dedicated wired wide-area network ("WAN") connections. This feature may eliminate a significant time requirement for local Internet service providers or telephone companies to deploy high-cost business-grade communication lines in remote locations. Further, the ability to ship remote access devices directly to individual or business consumers allows for easy on-site installation without the need to provision data access, to set up networks, or to configure additional devices. In addition, by interfacing with target devices at the hardware level rather than through a network connection, services may be performed on target devices that may not have working operating systems or network connections.

Various of the embodiments described herein may be implemented in digital electronic circuitry or in computer software, firmware, or hardware, including the structures disclosed in this specification and their structural equivalents or in combinations of one or more of them. Embodiments may also be implemented as one or more computer-program products, i.e. one or more modules of computer program instructions encoded on a computer-readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of such components. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, such as code that constitutes processor firmware, a protocol stack, a database management system, an operating system, or a combination of one or more of such code.

Processors suitable for execution of programs that may be used in embodiments of the invention may include any processor of any kind of digital computer. Generally, a processor receives instructions and data from a read-only memory or a random access memory or both. The elements of a computer are a processor for performing instructions and one or more memory devices for storing instructions and data. Typically, a computer also includes, or is operatively coupled to receive data from or transfer data to, or both, one or more mass storage devices for storing data such as magnetic disks, magneto-optical disks, or optical disks. But a computer need not have such devices. Moreover, a computer may be embedded in another device such as a mobile telephone, a personal digital assistant, a mobile audio player, a global positioning system receiver, a digital camera, among many other electronic devices. Computer-readable media suitable for storing computer program instructions and data include all forms of nonvolatile memory, media and memory devices, including, by way of example, semiconductor memory devices such as EPROM, EEPROM, and flash memory; magnetic disks such as internal hard disks or removable disks; magneto-optical disks; and CD-ROM and DVD-ROM disks. The processor and memory can be supplemented by, or incorporated in, special-purpose logic circuitry.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed:

1. A method for remotely servicing a target device having a target-device input/output interface with a remote access device having a remote-access-device input/output interface, the method comprising:
   operatively coupling the target-device input/output interface with the remote-access-device input/output interface at a hardware level;
   establishing a wireless communication link between the remote access device and a public communications network to establish a communication link between the remote access device and a computer remote from the target device and from the remote access device;

automatically detecting when the target device is coupled to the input/output interface with the remote access device and providing one or more functions in response to the automatic detection;

receiving service instructions from the computer at the remote access device over the communication link;

transmitting the received service instructions through the coupled input/output interfaces to service the target device;

wherein the remote access device is comprised by a self-service kiosk.

2. The method recited in claim 1 wherein the target device lacks a functioning operating system.

3. The method recited in claim 1 wherein the target device lacks a functioning public-network connection.

4. The method recited in claim 1 wherein the remote access device further has a data store and the service instructions comprise instructions to install data from the data store onto the target device, the method further comprising installing data from the data store onto the target device in accordance with the instructions.

5. The method recited in claim 4 wherein the data comprise an operating system image.

6. The method recited in claim 4 wherein the data comprise a diagnostic tool.

7. The method recited in claim 4 wherein the data comprise a software application.

8. The method recited in claim 1 wherein each of the target-device input/output interface and the remote-access-device input/output interface comprises a KVM/USB interface.

9. The method recited in claim 1 wherein the wireless communication link comprises a wireless wide-area-network communication link.

10. The method recited in claim 1 wherein the remote-access-device input/output interface comprises a single-node interface.

11. The method recited in claim 1 wherein the remote-access-device input/output interface comprises a multinode interface to which a second target device is operatively coupled at the hardware level.

12. A remote access device comprising:
an input/output interface adapted for operative coupling with a target device at a hardware level, wherein the input/output interface comprises a KVM/USB interface;
a wireless interface adapted for communicative coupling with a public communications network to establish a communication link between a computer remote from the target device and from the remote access device; and
a logic module comprising:
program code for receiving service instructions from the computer at the remote access device over the communication link; and
program code for transmitting the received instructions through the input/output interface to the target device;
wherein the remote access device is configured to automatically detect when the target device is coupled to the input/output interface and provide one or more functions in response to the detection.

13. The remote access device recited in claim 12 wherein the target device lacks a functioning operating system.

14. The remote access device recited in claim 12 wherein the target device lacks a functioning public-network connection.

15. The remote access device recited in claim 12 further comprising a data store, wherein:
the service instructions comprise instructions to install data from the data store onto the target device; and
the logic module further comprises program code for installing data from the data store onto the target device in accordance with the instructions.

16. The remote access device recited in claim 15 wherein the data comprise an operating system image.

17. The remote access device recited in claim 15 wherein the data comprise a diagnostic tool.

18. The remote access device recited in claim 15 wherein the data comprise a software application.

19. The remote access device recited in claim 12 wherein the wireless interface comprises a wireless wide-area-network interface.

20. The remote access device recited in claim 12 wherein the input/output interface comprises a single-node interface.

21. The remote access device recited in claim 12 wherein the input/output interface comprises a multinode interface adapted for operative coupling with a plurality of target devices.

22. The method of claim 1 wherein the service instructions are based upon diagnostic information of the target device.

23. A method for remotely servicing a target device having a target-device input/output interface with a remote access device having a remote-access-device input/output interface, the method comprising:
operatively coupling the target-device input/output interface with the single-node remote-access-device input/output interface at a hardware level;
establishing a wireless communication link between the remote access device and a public communications network to establish a communication link between the remote access device and a computer remote from the target device and from the remote access device;
receiving service instructions from the computer at the remote access device over the communication link;
transmitting the received service instructions through the input/output interfaces to service the target device, wherein the remote access device comprises a self-service kiosk.

* * * * *